United States Patent
Xu et al.

(10) Patent No.: US 11,800,041 B2
(45) Date of Patent: Oct. 24, 2023

(54) IMAGE PROCESSING METHOD AND APPARATUS, ELECTRONIC DEVICE, AND STORAGE MEDIUM

(71) Applicant: Beijing Xiaomi Mobile Software Co., Ltd., Beijing (CN)

(72) Inventors: Jing Xu, Beijing (CN); Lin Liu, Beijing (CN); Dan Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/453,774

(22) Filed: Nov. 5, 2021

(65) Prior Publication Data
US 2022/0239805 A1    Jul. 28, 2022

(30) Foreign Application Priority Data

Jan. 27, 2021  (CN) .......................... 202110113946.9

(51) Int. Cl.
*H04N 5/222* (2006.01)
*G06T 7/194* (2017.01)
(Continued)

(52) U.S. Cl.
CPC .......... *H04N 5/2226* (2013.01); *G06T 7/194* (2017.01); *H04N 5/2621* (2013.01); *H04N 23/69* (2023.01)

(58) Field of Classification Search
CPC ............. H04N 5/2226; H04N 5/23296; H04N 5/2621; H04N 5/23218; H04N 5/23229;
(Continued)

(56) References Cited

U.S. PATENT DOCUMENTS

| 10,757,319 | B1* | 8/2020 | Luo ........................ H04N 5/272 |
| 2014/0240553 | A1* | 8/2014 | Pylvanainen .......... G06V 10/24 348/240.2 |

(Continued)

FOREIGN PATENT DOCUMENTS

| CN | 109379537 A | 2/2019 |
| CN | 110099217 A | 8/2019 |

(Continued)

OTHER PUBLICATIONS

Liang, Y. et al., "The "Vertigo Effect" on Your Smartphone: Dolly Zoom via Single Shot View Synthesis," Proceedings of the 2020 IEEE/CVF Conference on Computer Vision and Pattern Recognition Workshops, Jun. 14, 2020, Seattle, Washington, 9 pages.

*Primary Examiner* — Timothy J Henn
(74) *Attorney, Agent, or Firm* — McCoy Russell LLP

(57) ABSTRACT

The disclosure relates to an image processing method. The method may include: obtaining an image frame obtained through photographing and performing background separation on the image frame to obtain a subject frame and a background frame; obtaining a plurality of target background frames based on the background frame, in which the plurality of target background frames contain the same background content, and sizes of the background content in the plurality of target background frames are inconsistent; and synthesizing a target subject frame and the plurality of target background frames respectively to obtain a plurality of target image frames, and encoding the plurality of obtained target image frames into a video file, in which the target subject frame is one frame of an image in the subject frame.

9 Claims, 5 Drawing Sheets

---

Obtain an image frame obtained through photographing and perform background separation on the image frame to obtain a subject frame and a background frame — 202

Obtain a plurality of target background frames based on the background frame, in which the plurality of target background frames contain the same background content, and sizes of the background content in the plurality of target background frames are inconsistent — 204

Synthesize a target subject frame and the plurality of target background frames respectively to obtain a plurality of target image frames, and encoding the plurality of obtained target image frames into a video file, in which the target subject frame is one frame of image in the subject frame — 206

(51) Int. Cl.
*H04N 5/262* (2006.01)
*H04N 23/69* (2023.01)

(58) Field of Classification Search
CPC ......... H04N 5/232935; H04N 5/23299; H04N 5/265; H04N 5/272; H04N 5/23212; G06T 7/194; G06T 3/40; G06T 13/80; G11B 27/031
See application file for complete search history.

(56) References Cited

U.S. PATENT DOCUMENTS

| | | | |
|---|---|---|---|
| 2014/0300646 A1* | 10/2014 | Pitts | G06T 3/40 345/660 |
| 2015/0286899 A1* | 10/2015 | Nakayama | G06T 3/40 382/224 |
| 2016/0225167 A1* | 8/2016 | Kameyama | H04N 5/2226 |
| 2018/0348992 A1 | 12/2018 | Ku et al. | |
| 2021/0125307 A1* | 4/2021 | Ranade | H04N 5/2621 |
| 2022/0358619 A1* | 11/2022 | Chen | G06T 3/0012 |

FOREIGN PATENT DOCUMENTS

| | | |
|---|---|---|
| CN | 110262737 A | 9/2019 |
| CN | 110266957 A | 9/2019 |
| CN | 111083380 A | 4/2020 |
| JP | 2017143354 A | 8/2017 |
| WO | 2022012231 A1 | 1/2022 |

\* cited by examiner

IMAGE PROCESSING METHOD AND APPARATUS, ELECTRONIC DEVICE, AND STORAGE MEDIUM

CROSS-REFERENCE TO RELATED APPLICATIONS

The present application claims priority to Chinese Patent Application No. 202110113946.9, filed on Jan. 27, 2021. The entire contents of the above-listed application is hereby incorporated by reference for all purposes.

BACKGROUND

Hitchcock zoom is also called Dolly Zoom and is an advanced filming technique in the field of video filming, and achieves a visual effect that a filmed subject stays roughly the same while a background space is zoomed out or zoomed in in a filmed video mainly in a mode of pushing and pulling a dolly and zooming, thereby making a movie spectator have emotions of anxiety and panic. A video special effect achieved through Hitchcock zoom is called a Hitchcock special effect.

SUMMARY

The disclosure relates to the field of image processing, and to an image processing method and apparatus, an electronic device, and a storage medium.

A first aspect of the disclosure provides an image processing method, including:
 obtaining an image frame obtained through photographing and performing background separation on the image frame to obtain at least one subject frame and at least one background frame;
 determining a unique target subject frame from the at least one subject frame, and obtaining a plurality of target background frames based on the at least one background frame, in which the plurality of target background frames contain the same background content, and sizes of the background content in the plurality of target background frames are inconsistent; and
 synthesizing the target subject frame and the plurality of target background frames respectively to obtain a plurality of target image frames, and encoding the plurality of obtained target image frames into a video file.

A second aspect of the disclosure provides an electronic device, including:
 a processor; and
 a memory, configured to store instructions executable by the processor.

The processor executes the executable instructions to implement the method according to the first aspect.

A third aspect of the disclosure provides a computer readable storage medium with computer instructions stored thereon. The steps of the method according to the first aspect are realized when the instructions are executed by a processor.

BRIEF DESCRIPTION OF THE DRAWINGS

Accompanying drawings here, which are incorporated in and constitute a part of this specification, illustrate embodiments consistent with the disclosure and, together with the specification, serve to explain principles of the disclosure.

DETAILED DESCRIPTION

Figure 1:
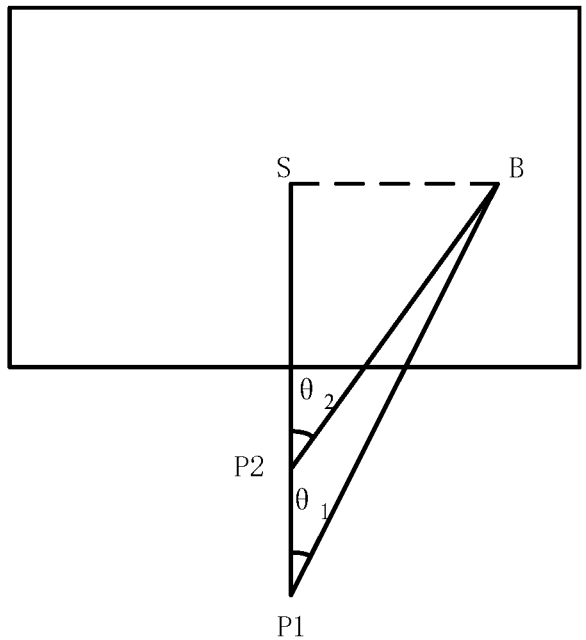
FIG. 1 is a schematic diagram of an imaging principle shown in some embodiments of the disclosure.

Some embodiments will be described here in detail, whose examples are shown in the drawings. Unless otherwise stated, when the following description concerns the drawings, the same numbers in the different drawings denote the same or similar elements. Implementations described in the following some embodiments do not represent all implementations consistent with the disclosure, or rather serve as only examples of an apparatus and a method consistent with some aspects of the disclosure.

Terms used in the present disclosure are merely for describing specific examples and are not intended to limit the present disclosure. The singular forms "one", "the", and "this" used in the present disclosure are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a certain feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a certain function.

In the related art, if it is needed to film a video image with the Hitchcock special effect, the filming technique of Hitchcock zoom must be strictly observed, change of an object distance between the dolly and the filmed subject and a focal length change of a lens keep stable in change rate, and the change rates of the both meet a certain mathematical relation. Generally, only professionals with advanced photography skills can make it, a large number of filming devices are needed, and the filming cost is high.

Hitchcock zoom is also called Dolly Zoom and is an advanced filming technique in the field of video filming, and achieves a visual effect that a filmed subject stays roughly the same while a background space is zoomed out or zoomed in in a filmed video mainly in a mode of pushing and pulling a dolly and zooming, thereby making a movie spectator have emotions of anxiety and panic. A video special effect achieved through Hitchcock zoom is called a Hitchcock special effect.

This video special effect is called the Hitchcock special effect, for it earliest appeared in a film Vertigo filmed by Hitchcock, the master of suspense, in 1958, and the corresponding filming technique is called Hitchcock zoom.

During practical application of Hitchcock zoom, if the dolly keeps approaching the filmed subject, a photographer needs to reduce a focal length of a lens in a certain rate according to a moving speed of the dolly; and when the dolly keeps leaving away from the filmed subject, the photographer needs to increase the focal length of the lens in a certain rate according to a moving speed of the dolly. Its theoretical basis is as follows.

If an object height of the filmed subject is h, in an initial state, an object distance is u1, an image distance is v1, a lens focal length of the dolly is f1, and an image height of a subject image is h1'. According to an imaging formula, it may be obtained:

$$\frac{1}{u_1} + \frac{1}{v_1} = \frac{1}{f_1}. \quad (1)$$

Through formula transformation, it may be obtained:

$$v_1 = \frac{u_1 f_1}{u_1 - f_1}. \quad (2)$$

A magnification M1 of imaging at this moment is:

$$M_1 = \frac{v_1}{u_1} = \frac{f_1}{u_1 - f_1}. \quad (3)$$

As the magnification may be also represented as a ratio of the image height to the object height, namely, $$M_1 = \frac{h_1'}{h}, \quad (4)$$

it may be obtained from the formulas (3) and (4):

$$h_1' = \frac{h f_1}{u_1 - f_1}$$

As the object distance is much larger than the focal length of the lens, which may be approximately:

$$h_1' = \frac{h f_1}{u_1}, \quad (5)$$

when the photographer changes the focal length of the lens of the dolly from f1 to f2, and meanwhile the photographer and the dolly move back and forth on a sliding rail, the object distance of the subject changes from u1 to u2, and thus the image height of the subject image changes from h1' to h2'. Similar to the formula (5), it may be obtained:

$$h_2' = \frac{h f_2}{u_2}, \quad (6)$$

and thus an image height change, namely, a change of a size of the subject image, caused by change of the lens focal length is:

$$\Delta h = h_2' - h_1' = h\left(\frac{f_2}{u_2} - \frac{f_1}{u_1}\right). \quad (7)$$

A Hitchcock lens special effect is characterized in that a size of a subject image does not change obviously, namely, Δh in the formula (7) is equal to 0. Therefore, the following relation may be obtained:

$$\frac{u_1}{u_2} = \frac{f_1}{f_2}. \quad (8)$$

Namely, a focal length ratio and an object distance ratio before and after change are directly proportional. In other words, under the condition of practical application of the Hitchcock zoom, if the object distance is increased, it is needed to increase the lens focal length, and if the object distance is reduced, it is needed to reduce the lens focal length.

By combining FIG. 1, the theoretical basis is further described as follows, namely, a size an image of a background in a picture changes under the condition of no change of the size of the image of the filmed subject. It may be known from the above introduction that it is only needed that a change ratio of the object distance and a change ratio of the focal length are just directly proportional so that the size of the image of the filmed subject does not change obviously.

As shown in FIG. 1, there are two object points in a setting, S is one object point on the subject, and B is one object point on the background. When the dolly moves from a position P1 to a position P2, an object distance of the subject object point S changes from SP1=u1 to SP2=u2, an object distance of the background object point B changes from BP1=w1 to BP2=w2. An included angle SP1B=θ1, and an included angle SP2B=θ2. Through a geometrical relationship, it may be obtained:

$$u_1 = w_1 \cos \theta_1 \quad (9)$$

$$u_2 = w_2 \cos \theta_2 \quad (10).$$

By combining the formula (8), a formula (11) may be obtained:

$$\frac{u_1}{u_2} = \frac{f_1}{f_2} = \frac{w_1 \cos\theta_1}{w_2 \cos\theta_2}. \quad (11)$$

As $\theta_1 < \theta_2$, $$\frac{w_1}{w_2} \neq \frac{f_1}{f_2}. \quad (12)$$

An image height of the background object point is g, and an image height change before and after change is $\Delta g'$. According to the formula (7), an image height change formula (13) of the background object point may be obtained:

$$\Delta g' = g\left(\frac{f_2}{w_2} - \frac{f_1}{w_1}\right). \quad (13)$$

By combining the formula (12), it may be known that the formula (13) is not equal to 0, namely, $$\Delta g' \neq 0 \quad (14).$$

Therefore, it is proved that when the image height of the object point on the filmed subject does not change, the image height of the object point in a background space changes necessarily.

However, it needs to be noted that a basis of the above analysis process is: the filmed subject must be located in a center position of the picture, and the object distance between the filmed subject and the lens cannot be too small, so that the object point on the filmed subject is prevented from deviating too much from the center position of the picture.

As shown in formula (11), as the background object point B is not in the center of the picture, when the object distance of the lens changes, a viewing angle of the background object point B changes, and consequently, image height changes caused by the object distance change and the focal length change cannot be mutually offset. As for the filmed subject, only a small portion of the object point is located in the true center of the picture, and a large portion of the subject object point also has a certain included angle of an viewing angle. However, as the included angle of the viewing angle of this portion of the object point is small, and change of the viewing angle caused by the object distance change is not obvious and is 0 approximately, it is approximately considered that the image height changes are mutually offset.

It may be known from the above introduction that when a video picture with the Hitchcock special effect is filmed, the filming technique of the Hitchcock zoom must be strictly observed, change of the object distance between the dolly and the filmed subject and the focal length change of the lens need to keep stable in change rate, and the change rates of the both meet a certain mathematical relation, namely, the object distance ratio and the focal length ratio before and after change always keep a directly proportional relation. Generally, only professionals with advanced photography skills can make it, a large number of filming devices are needed, and the filming cost is high.

For example, in one related art, the dolly needs to be controlled to approach the filmed subject in a stable rate by the aid of a sliding rail, and while the dolly is moved, the lens focal length is adjusted correspondingly in a manual focal length control mode. In another related art, a camera keeps a stable rate to approach the filmed subject in a stable flying mode of an unmanned aerial vehicle, but a focal length change rate of the lens needs to be calculated and set in advance.

Therefore, the disclosure provides an image processing method, so that the problems that in the related art, when the video picture with the Hitchcock special effect is filmed, extra facilities are needed, consequently the hardware cost is high, and a technical requirement for the photographer is high are avoided.

Figure 2:
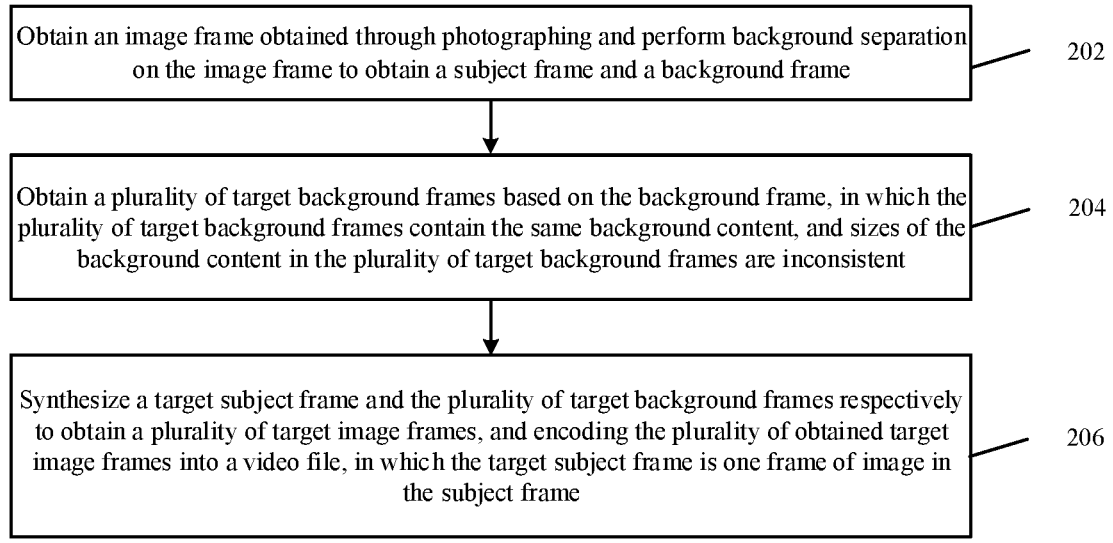
FIG. 2 is a flowchart of an image processing method shown in some embodiments of the disclosure.

FIG. 2 is an image processing method shown in some embodiments of the disclosure. As shown in FIG. 2, the method may include the following steps.

Step 202, an image frame obtained through photographing is obtained and is subjected to background separation to obtain a subject frame and a background frame.

It may be known from the above content of introducing the Hitchcock zoom that in the related art, when the video picture with the Hitchcock special effect is filmed, it is used: when the focal length change and the object distance change meet a certain mathematical relation, there are a phenomenon of mutually offsetting the influence of the focal length change and the object distance change on the imaging change of the filmed subject in the center of the picture. Based on this, the photographer may make the focal length change and the object distance change in a filming process meet the above mathematical relation as much as possible through the filming devices and/or the filming technique, so that the filmed video picture presents the Hitchcock special effect.

It is easy to understand that the related art starts from a generation principle of the Hitchcock special effect and obtains the video picture with the Hitchcock special effect only in an early-stage filming mode, consequently, there are high requirements for the filming devices and the professional quality of filming personnel in the related art.

In view of this, the disclosure does not rely on an offset function of the focal length change and the object distance change on the imaging change but starts from a presenting effect of the Hitchcock special effect and provides an image processing method combining early-stage filming and later-stage processing, so that the high requirement of the Hitchcock zoom for the filming devices and the filming personnel is avoided.

Specifically, the presenting effect of the Hitchcock special effect is a visual effect: the size of the filmed subject stays the same while the background space is zoomed out or zoomed in. Therefore, the disclosure adopts a mode of background separation for the image frame obtained through photographing to obtain a unique target subject frame and a plurality of target background frames. The plurality of target background frames contain the same background content, but sizes of the background content in the plurality of target background frames are inconsistent. Based on this, the unique target subject frame and the plurality of target background frames may be synthesized respectively, and target image frames obtained through synthesis are encoded into a video file.

It should be understood that as the disclosure adopts the same target subject frame in multiple image synthesis operation, the sizes of the filmed subject in the plurality of target image frames obtained through synthesis keep consistent necessarily, and as the plurality of target background frames in which the sizes of the background content are inconsistent are adopted in the multiple image synthesis operation, the background content in the plurality of target image frames obtained through synthesis is inconsistent necessarily. Obviously, through the technical solution of the disclosure, a finally obtained video file may contain the Hitchcock special effect 'the size of the filmed subject stays the same while the background space is zoomed out or zoomed in'.

Apparently, compared with the mode of obtaining the Hitchcock special effect through the Hitchcock zoom in the related art, the technical solution of the disclosure neither needs extra photographing devices nor needs the filming personnel to have excellent photographing skills, so that the hardware cost needed for filming is reduced while the requirement for the photographer is lowered.

Step 204, the plurality of target background frames are obtained based on the background frame. The plurality of target background frames contain the same background content, and the sizes of the background content in the plurality of target background frames are inconsistent.

In the disclosure, the unique target subject frame and the plurality of target background frames may be obtained in various mode.

In one embodiment, the photographer may take a photo through a photographing function in an electronic device, so that one image frame is obtained and subjected to background separation and one subject frame and one background frame are obtained. As only one subject frame is obtained, the subject frame may be directly used as the unique target subject frame, and correspondingly, as only one background frame is obtained, it does not meet a requirement for a plurality of target background frames, so that the embodiment may further perform multiple zooming on the background frame according to a plurality of pre-defined zooming ratios to obtain a plurality of target background frames.

In the embodiment, the plurality of pre-defined zooming ratios may be obtained in various modes.

In one case, a zooming ratio generation rule may be pre-defined and the plurality of zooming ratios are determined according to the zooming ratio generation rule. In some embodiments, the zooming ratio generation rule may be: the plurality of zooming ratios are obtained in a mode of decreasing progressively according to a preset difference value. Hypothetically, the difference value is 0.1, the plurality of zooming ratios obtained according to the rule may be 0.9, 0.8, 0.7, 0.6 . . . . In some embodiments, the zooming rule may be also: the plurality of zooming ratios are obtained in a mode of reducing the zooming ratios according to a fixed ratio. Hypothetically, the fixed ratio is 0.9, the plurality of zooming ratios obtained according to the rule may be: 0.9, 0.81, 0.729 . . . . Certainly, in the above rule, the plurality of zooming ratios may be obtained in a mode of increasing progressively according to a preset difference value or increasing according to a fixed ratio. The specific zooming ratio generation rule for obtaining the plurality of zooming ratios may be determined by those skilled in the art according to actual demands and is not limited herein.

In another case, the plurality of pre-defined zooming ratios may be manually set by a user. In some embodiments, a zooming ratio input option may be displayed in a photographing interface of the electronic device, and the user only needs to click the option to open an input interface of the zooming ratios. The user may set the zooming ratios in the interface by himself according to a needed visual effect before photographing.

Certainly, besides the above two modes, the plurality of zooming ratios may be directly preset as well for multiple zooming of the background frame obtained through background separation. How to obtain the plurality of zooming ratios specifically may be determined by those skilled in the art as required and is not limited herein.

In the embodiment, after the synthesis operation of the unique target subject frame and the plurality of target background frames are completed, the plurality of target image frames obtained through synthesis may be encoded into the video file in various modes. In one case, the zooming ratios adopted by the plurality of target background frames may be obtained as corresponding zooming ratios of the plurality of target image frames obtained through synthesis, the plurality of target image frames are sequenced according to a preset zooming ratio sequencing rule, and the plurality of target image frames are encoded into the video file according to a sequencing result.

For example, hypothetically, the zooming ratio sequencing rule is: the target image frames are sequenced in a mode of sequentially increasing of the zooming ratios, hypothetically, zooming ratios corresponding to target image frames A, B, C and D are respectively: 0.9, 0.8, 0.7 and 0.6, thus a sequence of the plurality of sequenced target image frames is: the target image frames D, C, B and A. Based on this, the plurality of target image frames are encoded into a video file according to the sequence of D, C, B and A.

During actual operation, the zooming ratio sequencing rule may be set according to actual demands. In some embodiments, if a visual effect that the background space is magnified continuously is needed to be realized, as shown in the above example, the plurality of target image frames are sequenced in a mode of sequentially increasing of the zooming ratios. What specific kind of the zooming ratio sequencing rule is adopted may be determined by those skilled in the art according to actual demands. In some embodiments, a mode of firstly increasing and then decreasing may be adopted for sequencing, so that a visual effect that the background space is zoomed in and then zoomed out is generated, and an atmosphere of tension and depression is made for a spectator, which is not limited herein.

In another embodiment, the photographer may obtain the plurality of image frames by photographing a video, and perform background separation on the plurality of obtained image frames respectively so as to obtain a plurality of subject frames and a plurality of background frames. It needs to be noted that when the photographer photographs this video, a position of the filmed subject in the picture should keep unchanged approximately, so that it is guaranteed that background content in the plurality of background frames obtained through subsequent separation stays the same, but at least one photographing parameter needs to be adjusted at the same time, so that sizes of the background content are inconsistent. In some embodiments, the photographer may photograph this video in a mode of pushing and pulling the electronic device back and forth (namely, a mode of changing the object distance), or in a mode of adjusting the lens focal length. After the plurality of subject frames are obtained, the embodiment may select out one subject frame from the plurality of subject frames as the unique target subject frame, and determines at least two of the plurality of obtained background frames as the target background frames.

During actual operation, the target subject frame may be selected according to a preset standard. In some embodiments, the subject frame of which the filmed subject accounts for the maximum or the minimum may be determined as the target subject frame from the plurality of subject frames. In some other embodiments, the subject frame obtained through separation of the image frames photographed earliest or latest may be used as the target subject frame. Correspondingly, the target background frames may be selected according to a preset standard. In some embodiments, the plurality of background frames may be all used as the target background frames. In some other embodiments, the target background frames may be screened out from the plurality of background frames according to a certain screening rule. Certainly, the above modes of determining the target subject frame and the target background frames are exemplary, how to determine the target subject frame and the target background frames from the plurality of subject frames and background frames obtained through background separation may be determined by those skilled in the art according to actual demands and is not limited herein.

Similar to the last embodiment, the embodiment may encode the plurality of target image frames obtained through synthesis in various mode into the video file.

In one case, the embodiment may determine a time sequence of photographing the plurality of image frames to which the plurality of target background frames correspond, and sequence the plurality of target image frames obtained through synthesis according to the determined time sequence. Based on this, the plurality of target image frames may be encoded into the video file according to a sequencing result.

For example, hypothetically, determined four target background frames A', B', C' and D' are obtained through background separation of the photographed image frames A, B, C and D respectively, and four target image frames a, b, c and d are obtained through synthesis based on these four target background frames. Hypothetically, a time sequence of photographing the image frames A, B, C and D is "A→B→C→D". Thus, the four target image frames are sequenced as "a→b→c→d", and the four target image frames may be encoded into a video file according to a sequencing result.

In another case, the embodiment may determine a ratio of background accounting for the plurality of target background frames, and sequence the plurality of target image frames obtained through synthesis based on the plurality of target background frames according to a pre-defined ratio sequencing rule. Based on this, the plurality of target image frames may be encoded into the video file according to a sequencing result. In this case, the ratio sequencing rule may be determined according to actual demands. In some embodiments, sequencing may be performed in a mode of sequentially increasing or decreasing of the ratio. Certainly, sequencing may be performed in a mode of increasing and then decreasing or decreasing and then increasing, and how to sequence specifically may be determined according to actual demands and is not limited herein.

Step 206, the target subject frame and the plurality of target background frames are synthesized respectively to obtain the plurality of target image frames, and the plurality of obtained target image frames are encoded into the video file. The target subject frame is one frame of image in the subject frame.

In the disclosure, as a background separation technology is used, during actual operation, a situation that the filmed subject in the target subject frame is not sufficient enough to fill up a blank region in the target background frames may occur. In view of this, the disclosure may fill up the blank region through an image filling technology in the field of image processing, so that the situation that there is still the blank region in the synthesized target image frames can be avoided. In the disclosure, any image filling technology in the field may be adopted for filling up the blank region in the target image frames.

Certainly, besides filling up the blank region in the target image frames through the image filling technology, a certain limit may be performed in a process of determining the target subject frame and the target background frames, so that it is avoided that the blank region exists in the synthesized target image frames.

In some embodiments, in an embodiment of obtaining the only one image frame, the plurality of target background frames may be obtained in a mode of multiple zooming out only the background frame obtained through background separation. It should be understood that if only the background frame is zoomed out, the blank region in the background frame caused by background separation will be reduced necessarily, the determined target subject frame is sufficient enough to fill up the blank region in the plurality of target background frames. Therefore, in this case, the situation that the blank region exists in the synthesized target image frames does not occur.

In some embodiments, in an embodiment of obtaining the plurality of image frames, the subject frame with the largest size of the filmed subject may be determined as the target subject frame from the plurality of subject frames obtained through background separation, thus when the target subject frame and the plurality of target background frames are synthesized, the target subject frame can necessarily fill up the blank region of all the target background frames, namely, the situation that the blank region exists in the target image frames obtained through synthesis does not occur.

It needs to be emphasized that the technical solution of the disclosure may be applied to any type of electronic device, and the electronic device only needs to be provided with a camera and have an image obtaining function. In some embodiments, the electronic device may be a smartphone, a tablet PC and other mobile terminals or a smart TV with a camera, a personal computer (PC) and other fixed terminals. What specific type of electronic device is used as an executing body of the technical solution of the disclosure is determined by those skilled in the art according to actual demands and is not limited herein.

It may be known from the above technical solution that in the disclosure, after the image frames are obtained, the image frames may be subjected to image separation to obtain corresponding subject frames and background frames, the unique target subject frame is determined based on the subject frames, and the plurality of target background frames in which the sizes of the background content are inconsistent are obtained based on the background frames. Based on this, the unique target subject frame and the plurality of target background frames may be synthesized so that the plurality of target image frames in which the sizes of the filmed subject are consistent and the sizes of the background content are inconsistent are obtained.

It should be understood that the plurality of target image frames are obtained through synthesis by means of the same target subject frame, so that the sizes of the filmed subject in the plurality of target image frames keep consistent necessarily. Likewise, as the plurality of target image frames are obtained through synthesis by means of the different target background frames in which the sizes of the background content are inconsistent, the sizes of the background content in backgrounds of the plurality of target image frames are inconsistent necessarily. Correspondingly, after the plurality of target image frames are encoded into the video file, the Hitchcock special effect that the filmed subject stays the same and the background space is zoomed out or zoomed in may occur in the video picture.

Compared with the mode of obtaining the Hitchcock special effect through the Hitchcock zoom in the related art, the technical solution of the disclosure does not rely on the offset function of the focal length change and the object distance change on the imaging change any more, it starts from the presenting effect of the Hitchcock special effect, and the Hitchcock special effect is realized through a later-stage processing mode such as a background separation technology. Accordingly, the technical solution of the disclosure has quite low requirement for filming techniques and filming devices, and avoids the problems that in the related art, extra filming devices are needed, and consequently the cost is too high, and the problem of a high technical threshold for a photographer.

Besides, in the related art, as imaging change amplitude is relevant to a distance between an image and the center position of the picture (namely, an offset phenomenon of the focal length change and the object distance change on the imaging change only occurs in a center region of the picture), during the Hitchcock zoom, the filmed subject must keep in the center of the picture, and in the video picture with the Hitchcock special effect obtained in this mode, the filmed subject is necessarily located in the center of the picture. However, the technical solution of the disclosure does not rely on the offset function of the focal length change and the object distance change on the imaging change any more, in an early-stage filming process, the filmed subject is not required to be in the center of the picture any more. In other words, through the technical solution of the disclosure, besides obtaining a traditional Hitchcock special effect of making the size of the filmed subject in the center of the picture stays unchanged, the Hitchcock special effect of which the filmed subject is not located in the center of the picture may be obtained. In some embodiments, the filmed subject may be located in a left half region or right half region and the like of the picture.

Furthermore, the disclosure may adopt the mode of photographing the only one image frame and multiple zooming the background frame obtained through background separation of the image frame to obtain the plurality of target background frames in which the sizes of the background content are inconsistent. In this case, the user takes only one photo containing the filmed subject equivalently, and a filming operation of the photographer is simplified to the maximum degree.

The technical solution of the disclosure is introduced below in a mode of specific embodiments by taking the electronic device being the smartphone for example.

Figure 3:
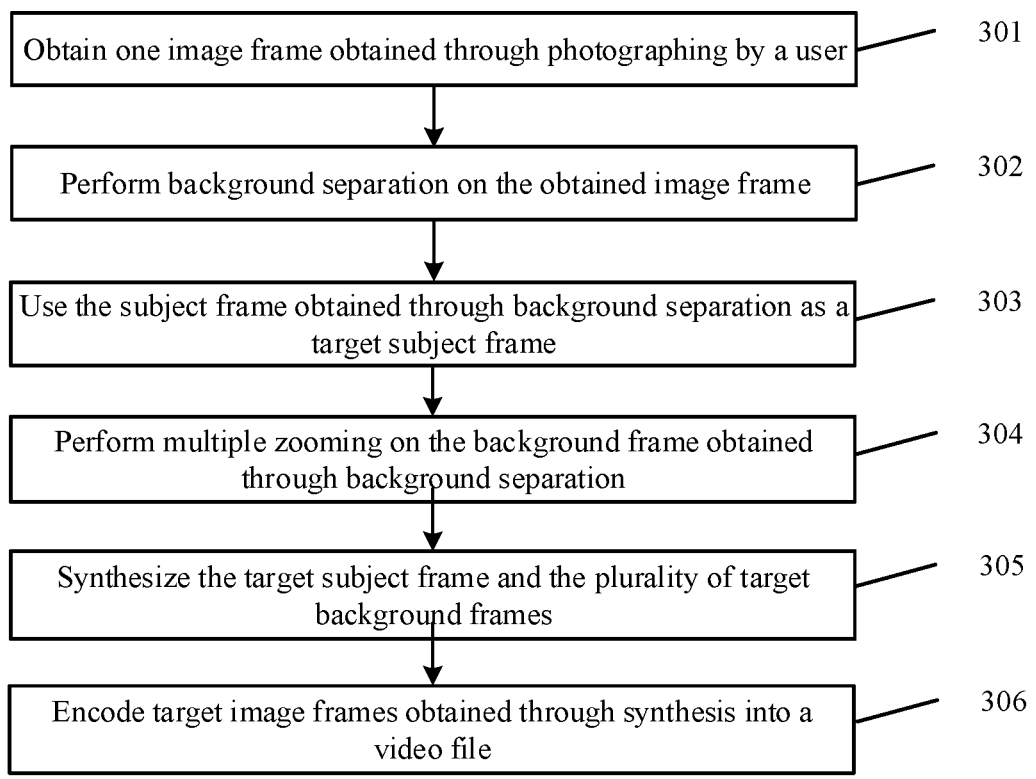
FIG. 3 is a flowchart of another image processing method shown in some embodiments of the disclosure.

FIG. 3 is a flowchart of another image processing method shown in some embodiments of the disclosure. As shown in FIG. 3, the method includes the following steps.

Step 301, one image frame obtained by the user through photographing is obtained.

In the embodiment, the user may open a photographing application program in the smartphone to obtain one image frame containing the filmed subject in a mode of taking a photo.

Step 302, the obtained image frame is subjected to background separation.

In the embodiment, the unique obtained image frame may be subjected to background separation to obtain the subject frame containing only the subject frame and the background frame containing only the background.

Step 303, the subject frame obtained through background separation is used as the target subject frame.

As only one image frame is obtained in the embodiment, after the image frame is subjected to background separation, only one subject frame may be obtained, and thus the subject frame only needs to be directly used as the unique target subject frame.

Step 304, multiple zooming is performed on the background frame obtained through background separation.

After the one background frame is obtained through background separation, the plurality of target background frames may be obtained in a mode of multiple zooming the background frame in the embodiment.

For example, the zooming ratios may be fixed values preset in the smartphone. In some embodiments, the plurality of preset zooming ratios may be: 0.9, 0.8, 0.7, 0.6 and 0.5. Then the background frame obtained through background separation may be subjected to zooming for five times according to the zooming ratios to obtain five target background frames. Of course, in practical application, the background frame which is not zoomed may be also used as the target background frame, which is determined specifically according to actual demands and is not limited herein.

Step 305, the target subject frame and the target background frames obtained through multiple zooming are respectively subjected to image synthesis.

After the unique target subject frame and the plurality of target background frames are obtained, they are synthesized respectively to obtain the plurality of target image frames in which the filmed subject stays the same but the sizes of the background content in the background space are inconsistent.

Continuing the above example, hypothetically, the target subject frame is X, and the plurality of target background frames are A to E respectively. Thus, X and A are synthesized, X and B are synthesized, X and C are synthesized, X and D are synthesized, and X and E are synthesized, so that the five target image frames are obtained.

Step 306, the plurality of target image frames obtained through synthesis are encoded into the video file.

In this step, as the plurality of target background frames are obtained by multiple zooming the background frame obtained through background separation, the sizes of the plurality of target image frames obtained through synthesis based on the plurality of target background frames are inconsistent. Accordingly, before the plurality of target image frames are encoded into the video file, the plurality of target image frames may be cut, so that the sizes of the plurality of cut target image frames keep consistent.

Besides, in the above zooming process, the situation that the zooming ratios are larger than 1 may occur. In this case, the blank region of the zoomed target background frames is generally larger than the filmed subject in the subject frame, consequently, the blank region still exists in the target image frames obtained through image synthesis. In this case, the image filling technology may be adopted in the image synthesis process so that no blank region exists in the target image frames obtained through synthesis, or after synthesis is completed, the image filling technology is adopted for filling up the blank region in the obtained target image frames, and thus the situation that the blank region exists in the target image frames is avoided.

It needs to be emphasized that the embodiment may adopt any mode to encode the plurality of target image frames into the video file. What specific kind of mode is adopted depends on what kind of Hitchcock special effect needs to be realized. In some embodiments, when a Hitchcock special effect of continuously zooming out the background space needs to be realized, the plurality of target images frames may be sequenced in a mode of continuously decreasing of the zooming ratios and then are encoded into the video file. When other types of Hitchcock special effect need to be realized, it is similar to this and will not be detailed herein.

It may be known from the above technical solution that in the embodiment, after the one image frame photographed by the user is subjected to background separation, the plurality of target background frames with different background spaces are obtained in a mode of multiple zooming processing of the background frame obtained through background separation. Based on this, the subject frame obtained through separation is used as the target subject frame and subjected to image synthesis with the plurality of target background frames respectively so that the plurality of target image frames are obtained.

It should be understood that as a plurality of target backgrounds are obtained through synthesis of the same target subject frame, the size of the filmed subject in a video obtained through encoding based on the plurality of target image frames stays the same all the time. Based on the same logic, as the plurality of target backgrounds are respectively obtained through synthesis of the plurality of target background frames with the different background spaces, the background space in the video obtained through encoding based on the plurality of target image frames keeps changing. In other words, the Hitchcock special effect can be added into the video picture through the above method.

Furthermore, as the Hitchcock special effect can be realized by photographing only one image frame by the user through the method of the embodiment, the operation of realizing the Hitchcock special effect in the video is further simplified, and consumed energy of the user is reduced. It is easy to understand that the method photographs the video picture with the Hitchcock special effect equivalently in a mode of photos and turns a common sense of filming a video with the Hitchcock special effect only in a mode of filming a video in the related art upside down.

Figure 4:
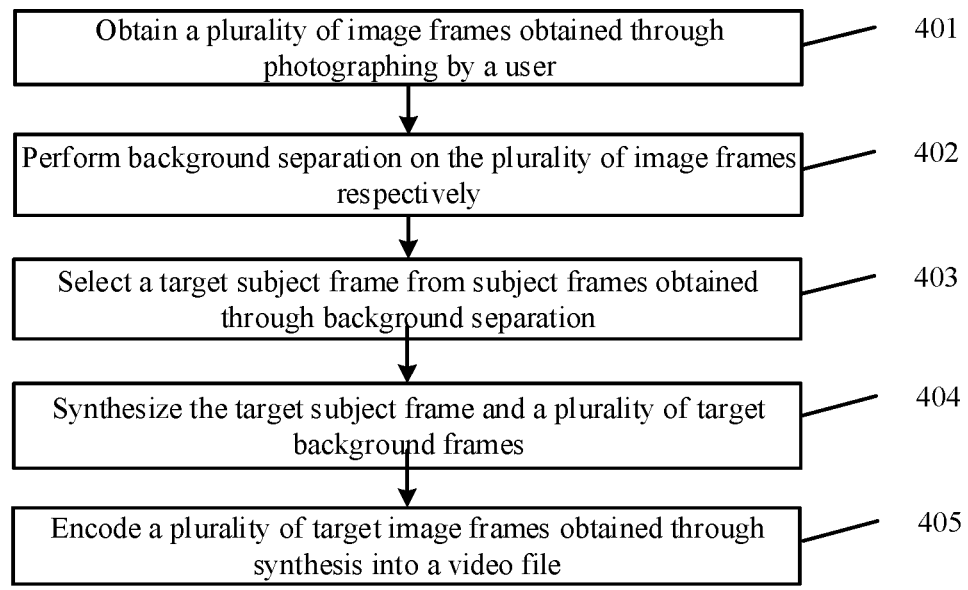
FIG. 4 is a flowchart of yet another image processing method shown in some embodiments of the disclosure.

FIG. 4 is yet another image processing method shown in some embodiments of the disclosure. As shown in FIG. 4, the method may include the following steps.

Step 401, the plurality of image frames are obtained through photographing by the user.

In the embodiment, the user may hold a mobile phone with a hand to photograph a video in a mode of moving back and forth, so that the mobile phone can obtain the plurality of image frames.

Step 402, the plurality of image frames are subjected to background separation respectively.

The plurality of image frames may be subjected to background separation after being obtained, so that a plurality of subject frames and a plurality of background frames can be obtained.

Step 403, one subject frame is selected from the plurality of subject frames obtained through background separation as the unique target subject frame.

In the embodiment, after the plurality of image frames obtained through photographing are subjected to background separation respectively, the plurality of subject frames may be obtained. As the embodiment only needs the unique target subject frame, the one subject frame may be selected from the plurality of obtained subject frames as the target subject frame.

In some embodiments, a subject frame obtained through separation of the first image frame obtained through photographing may be determined as the target subject frame. Certainly, during practical operation, the unique target subject frame may be determined by those skilled in the art in any mode introduced above according to actual demands, which is not limited herein.

Step 404, the determined target subject frame and the plurality of background frames obtained through background separation are respectively subjected to image synthesis.

As the plurality of image frames are obtained through photographing in the embodiment, the plurality of background frames may be obtained through background separation of the plurality of image frames. Therefore, in the embodiment, the plurality of background frames may be directly determined as the target background frames. Based on this, the determined unique target subject frame and the plurality of target background frames may be respectively synthesized to obtain the plurality of target image frames.

Step 405, the plurality of target image frames obtained through synthesis are encoded into a video.

Similar to the last embodiment, the embodiment may have the situation that the filmed subject in the target subject frame is not sufficient enough to fill up the blank region in the target background frames. The processing mode of this situation is similar to that of the last embodiment and will not be detailed herein.

In the embodiment, the plurality of target image frames may be encoded into the video in various modes. In some embodiments, the plurality of target image frames may be encoded into the video according to a time sequence of photographing the image frames. In some other embodiments, the plurality of target image frames obtained through synthesis based on the plurality of target background frames may be sequenced according to a ratio which the blank regions account for in each target background frame, and the plurality of target image frames are encoded into the video according to a sequencing result.

It may be known from the above technical solution that through the technical solution of the embodiment, the user only needs to push and pull the mobile phone back and forth to photograph the video so that the Hitchcock special effect can be realized in the obtained video picture. There are no strict requirements for a push-pull speed, a push-pull distance and the like. Obviously, the disclosure does not need to use the mode that in the related art, the Hitchcock special effect can be realized in the filmed video picture only in a mode of the Hitchcock zoom, and greatly lowers a technical threshold of realizing the Hitchcock special effect in the video picture.

Compared with the last embodiment, the plurality of target background frames in the embodiment are obtained through respective image separation of the plurality of image frames obtained through early-stage photographing instead of being obtained through multiple zooming of the same background frame. In other words, the embodiment obtains the plurality of target background frames with the different background spaces through an early-stage photographing mode instead of a zooming mode of the same background frame.

It should be understood that compared with a later-stage zooming mode, the background spaces in the plurality of target background frames obtained through early-stage photographing are more natural, then change of the background space in the video picture obtained through encoding is more natural, and the visual effect of the Hitchcock special effect in the finally obtained video picture is improved.

Figure 5:
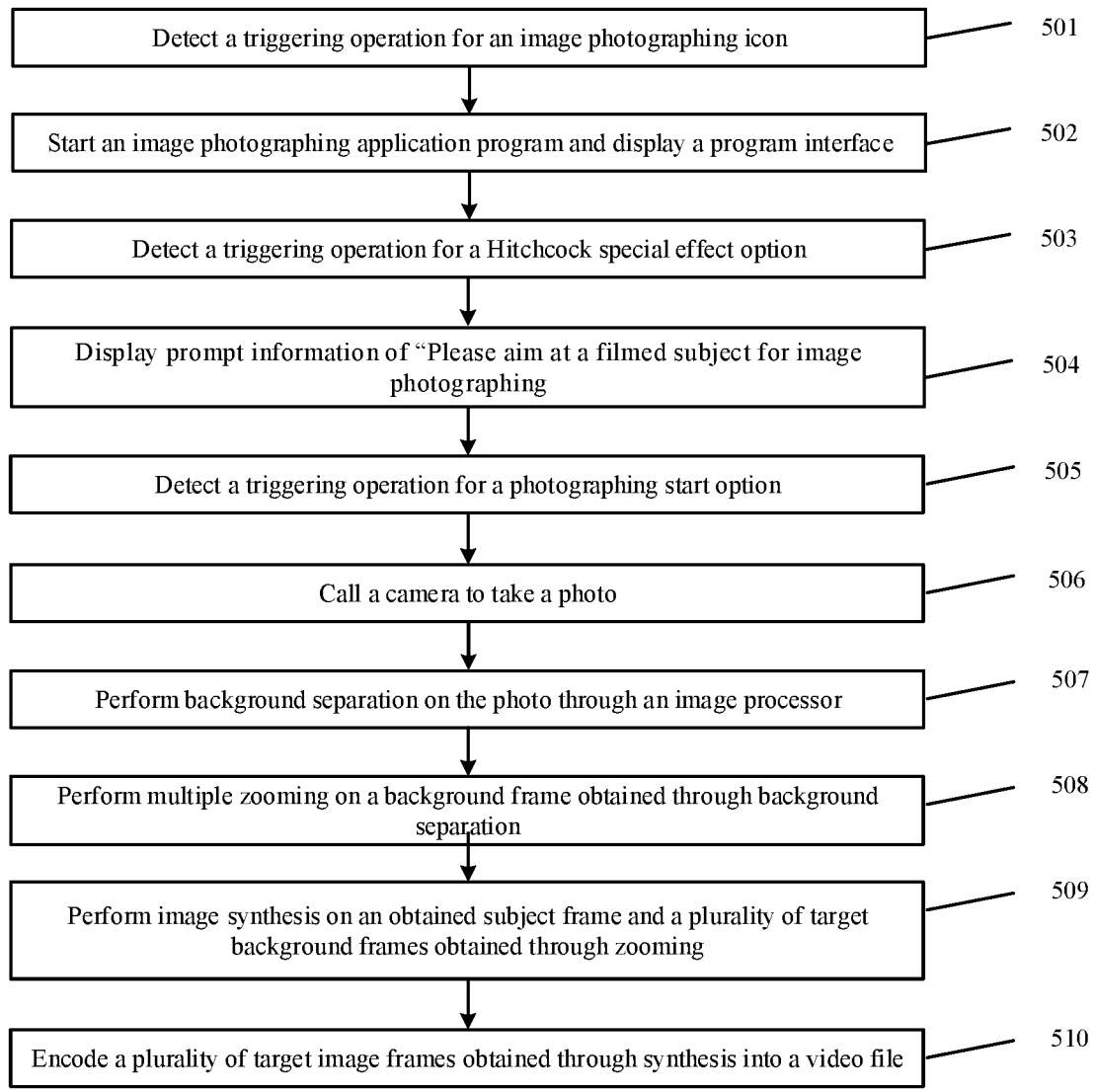
FIG. 5 is a flowchart of a Hitchcock special effect implementation method shown in some embodiments of the disclosure.

FIG. 5 is a flowchart of a Hitchcock special effect realizing method shown in some embodiments of the disclosure. As shown in FIG. 5, the method may include the following steps.

Step 501, a triggering operation for an image photographing icon is detected.

In the embodiment, an application program with an image photographing function may be pre-installed in the mobile phone. The user only needs to trigger a corresponding image photographing icon (corresponding to the application program with the image photographing function) to perform image photographing when needing to photograph an image.

Step 502, the image photographing application program is opened and a corresponding program interface is displayed.

In the embodiment, after the triggering operation for the image photographing icon by the user is detected, the corresponding program interface can be displayed. Two photographing options of "video" and "photo" can be displayed in the interface so that the user can select an image mode of photographing this time.

After it is detected that the user selects the "video" option, the embodiment can further display various video special effect options, so that the user can select a video special effect needing to be added into the video picture photographed this time, in some embodiments, a plurality of selectable video special effect options such as fade-in, fade-out, darker, brighter and the Hitchcock special effect can be displayed.

Step 503, a triggering operation for a Hitchcock special effect option is detected.

In the embodiment, the user can trigger the Hitchcock special effect option to indicate that the Hitchcock special effect needs to be added into the video picture photographed this time.

The mobile phone may adjust its video photographing mode to a photographing mode of realizing the Hitchcock special effect after detecting the triggering operation for the Hitchcock special effect option by the user. Based on this, once the mobile phone detects a triggering operation for a photographing start option, corresponding later-stage processing can be performed on the image frames obtained through photographing, and thus the Hitchcock special effect can be added into the photographed video picture.

Step 504, prompt information of "Please aim at the filmed subject for image photographing" is displayed.

In the embodiment, the mobile phone may further display notes of photographing after detecting the triggering operation for the Hitchcock special effect option by the user.

In the embodiment, the Hitchcock special effect is realized in the mode shown in FIG. 3. As the video picture with the Hitchcock special effect can be obtained by photographing only one image frame in FIG. 3, it is only needed to display the prompt information "Please aim at the filmed subject for image photographing" to the user.

Certainly, the embodiment is introduced only by taking "realizing the Hitchcock special effect in the mode shown in FIG. 3" for example. It should be understood that actually displayed prompt information is supposed to correspond to an adopted implementation. In some embodiments, when the Hitchcock special effect is realized in the mode shown in FIG. 4, prompt information "Please keep the filmed subject fixed in the picture and move back and forth to photograph a video" may be displayed to the user.

Besides, the mobile phone may display options of "photographing a photo" and "photographing a video" again on the basis of triggering the Hitchcock special effect option by the user so that the user can select the mode shown in FIG. 3 or the mode shown in FIG. 4 to obtain the video with the Hitchcock special effect. The prompt information of "Please aim at the filmed subject for image photographing" is displayed on the basis of selecting the "photographing a photo" option by the user, and the video with the Hitchcock special effect is obtained in the processing mode shown in FIG. 3. The prompt information of "Please keep the filmed subject fixed in the picture and move back and forth to photograph a video" is displayed on the basis of selecting the "photographing a video" option by the user, and the video with the special Hitchcock special effect is obtained in the processing mode shown in FIG. 4.

Step 505, the triggering operation for the photographing start option is detected.

In the embodiment, as the mode shown in FIG. 3 is adopted, when the triggering operation for the photographing start option by the user is detected, only one photo needs to be photographed.

Step 506, a camera is called to take a photo.

Step 507, a photo obtained through photographing is subjected to background separation through an image processor.

Step 508, the plurality of preset zooming ratios are obtained so that multiple zooming can be performed on the background frame obtained through background separation.

Step 509, the subject frame obtained through background separation and the plurality of target background frames obtained through multiple zooming are respectively subjected to image synthesis.

Step 510, the plurality of target image frames obtained through synthesis are encoded into the video file.

In the above steps, how to specifically determine the zooming ratios, perform image synthesis and encode the plurality of target image frames obtained through synthesis into the video file may refer to introduction of the embodiment shown in FIG. 3 and will not be detailed herein.

The embodiment introduces the technical solution of the disclosure only by taking "realizing the Hitchcock special effect through the method shown in FIG. 3" for example. If the method shown in FIG. 4 is adopted, steps 504 to 510 only need to be replaced correspondingly, and the specific mode may refer to introduction in FIG. 4 and will not be detailed herein.

It may be known from the above technical solution, the disclosure can adopt the mode of adding the Hitchcock special effect option into the image photographing application program so that the Hitchcock special effect can be added into the photographed video picture by making a simple selecting operation when the user needs to photograph the video picture with the Hitchcock special effect.

After the user selects the Hitchcock special effect option, the mobile phone can display corresponding photographing notes in the interface so that the user is prompted to perform photographing in a standard mode, and a situation that the Hitchcock special effect cannot be added into the video picture due to a non-standard photographing mode is avoided.

Besides, in the embodiment, the user may photograph the video picture with the Hitchcock special effect by photographing only one photo, so that the operation of realizing the Hitchcock special effect is greatly simplified, and the technical threshold of realizing the Hitchcock special effect is further lowered.

Figure 6:
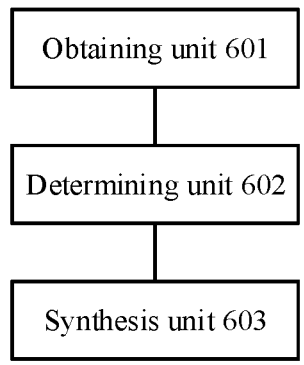
FIG. 6 is a block diagram of an image processing apparatus shown in some embodiments of the disclosure.

FIG. 6 is a block diagram of an image processing apparatus shown in some embodiments of the disclosure. Referring to FIG. 6, the apparatus includes an obtaining unit 601, a determining unit 602 and a synthesis unit 603.

The obtaining unit 601 is configured to obtain an image frame obtained through photographing and perform background separation on the image frame to obtain a subject frame and a background frame;

the determining unit 602 is configured to obtain a plurality of target background frames based on the background frame, the plurality of target background frames contain the same background content, and sizes of the background content in the plurality of target background frames are inconsistent; and the synthesis unit 603 is configured to synthesize a target subject frame and the plurality of target background frames respectively to obtain a plurality of target image frames, and encode the plurality of obtained target image frames into a video file, and the target subject frame is one frame of image in the subject frame.

Optionally, the obtaining unit 601 is further configured to: obtain one image frame obtained through photographing and perform background separation on the image frame to obtain one subject frame and one background frame corresponding to the image frame;

the determining unit 602 is further configured to: use the one subject frame obtained through background separation as the target subject frame; and the determining unit 602 is further configured to: perform multiple zooming on the one background frame obtained through background separation according to a plurality of pre-defined zooming ratios to obtain the plurality of target background frames.

Optionally, the plurality of pre-defined zooming ratios are manually set by a user or determined according to a pre-defined zooming ratio generation rule.

Optionally, the synthesis unit 603 is further configured to:

obtain the plurality of zooming ratios corresponding to the plurality of target image frames and sequence the plurality of target image frames according to a preset zooming ratio sequencing rule, and the plurality of target image frames are encoded into the video file according to a sequencing result.

Optionally, the obtaining unit 601 is further configured to:

obtain the plurality of image frames obtained through photographing, in which a filmed subject is located in the same position in each image frame; and perform background separation on the plurality of image frames respectively to obtain the plurality of subject frames and the plurality of background frames;

the determining unit 602 is further configured to: select one subject frame from the plurality of subject frames as the target subject frame; and the determining unit 602 is further configured to: determine at least two of the plurality of background frames obtained through background separation as the target background frames.

Optionally, the determining unit 602 is further configured to:

select one subject frame from the plurality of subject frames as the target subject frame according to a pre-defined selection rule.

The selection rule includes any one as follows.

Among the plurality of subject frames, the subject frame of which the filmed subject accounts for the maximum or the minimum may be used as the target subject frame; or the subject frame obtained through separation of the image frame photographed earliest or latest is used as the target subject frame.

Optionally, the synthesis unit 603 is further configured to:

determine a time sequence of photographing the plurality of image frames to which the plurality of target background frames correspond respectively, sequence the plurality of target image frames according to the determined time sequence, and encode the plurality of target image frames into the video file according to the sequencing result.

Optionally, the synthesis unit 603 is further configured to:

determine ratios which backgrounds account for in the plurality of target background frames, and sequence the plurality of target image frames obtained through synthesis based on the plurality of target background frames according to a pre-defined ratio sequencing rule; and encode the plurality of target image frames into the video according to the sequencing result.

As the device embodiment basically corresponds to the method embodiment, the related portion may refer to part of description of the method embodiment. The above described device embodiment is only exemplary, units described as separation components may be or not be physically separated, components shown as units may be or not be physical units, which may be located in one place or distributed onto a plurality of network units. Part of or all of modules may be selected to realize the purposes of the solution of the disclosure according to actual demands. Those ordinarily skilled in the art may understand and implement the solution without creative work.

Correspondingly, the disclosure further provides an image processing apparatus, including: a processor, and a memory configured to store instructions executable by the processor. The processor is configured to implement any image processing method according to the above embodiment. For example, the method may include: an image frame obtained through photographing is obtained and is subjected to background separation to obtain a subject frame and a background frame; a plurality of target background frames are obtained based on the background frame; the plurality of target background frames contain the same background content, and sizes of the background content in the plurality of target background frames are inconsistent; a target subject frame and the plurality of target background frames are synthesized respectively to obtain a plurality of target image frames, and the plurality of obtained target image frames are encoded into a video file; and the target subject frame is one frame of image in the subject frame.

Correspondingly, the disclosure further provides an electronic device, including a memory and one or more programs stored in the memory. It is configured to make one or more processors execute instructions which are used for realizing any image processing method in the above embodiment and contained in the one or more programs. For example, the method may include: an image frames obtained through photographing is obtained and subjected to background separation to obtain a subject frame and a background frame; a plurality of target background frames are obtained based on the background frame; the plurality of target background frames contain the same background content, and sizes of the background content in the plurality of target background frames are inconsistent; a target subject frame and the plurality of target background frames are synthesized respectively to obtain a plurality of target image frames, and the plurality of obtained target image frames are encoded into a video file; and the target subject frame is one frame of image in the subject frame.

Figure 7:
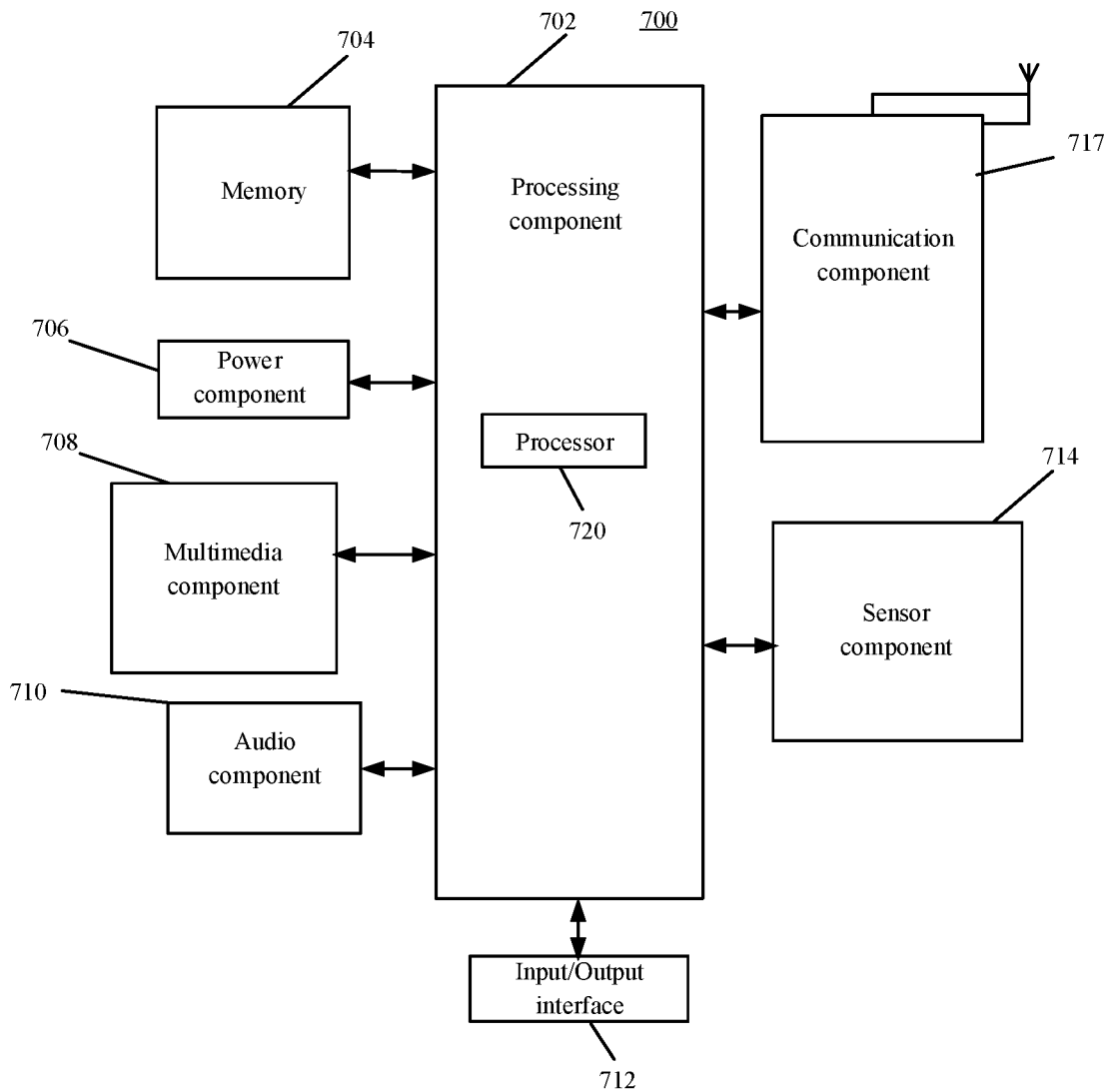
FIG. 7 is a schematic structural diagram of an electronic device in some embodiments of the disclosure.

FIG. 7 is a block diagram of an apparatus 700 for implementing a process scheduling method shown according to some embodiments. In some embodiments, the apparatus 700 may be a mobile phone, a computer, a digital broadcast terminal, a message transmitter-receiver, a game console, a tablet device, a medical facility, a fitness facility, a personal digital assistant and the like.

Referring to FIG. 7, the apparatus 700 may include one or more components as follows: a processing component 702, a memory 704, a power component 706, a multimedia component 708, an audio component 710, an input/output (I/O) interface 712, a sensor component 714 and a communication component 716.

The processing component 702 generally controls whole operation of the apparatus 700, such as operation related to display, phone call, data communication, camera operation and recording operation. The processing component 702 may include one or more processors 720 for executing the instructions to complete all or part of steps of the above method. Besides, the processing component 702 may include one or more modules to facilitate interaction between the processing component 702 and the other components. In some embodiments, the processing component 702 may include a multimedia module to facilitate interaction between the multimedia component 708 and the processing component 702.

The memory 704 is configured to store various data to support operation on the apparatus 700. Examples of these data include instructions of any application program or method for operation on the apparatus 700, contact person data, telephone directory data, messages, pictures, videos and the like. The memory 704 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 706 provides power for the various components of the apparatus 700. The power component 706 may include a power management system, one or more power sources, and other components related to power generation, management and distribution for the apparatus 700.

The multimedia component 708 includes a screen which provides an output interface between the apparatus 700 and a user. In some embodiments, the screen may include a liquid crystal display (LCD) and a touch panel (TP). If the screen includes the touch panel, the screen may be realized as a touch screen to receive an input signal from the user. The touch panel includes one or more touch sensors to sense touching, swiping and gestures on the touch panel. The touch sensor can not only sense a boundary of a touching or swiping action, but also detect duration and pressure related to touching or swiping operation. In some embodiments, the multimedia component 708 includes a front camera and/or a rear camera. When the apparatus 700 is in an operation mode, such as a photographing mode or a video mode, the front camera and/or the rear camera can receive external multimedia data. Each front camera and each rear camera may be a fixed optical lens system or have a focal length and an optical zoom capability.

The audio component 710 is configured to output and/or input an audio signal. In some embodiments, the audio component 710 includes a microphone (MIC). When the apparatus 700 is in the operation mode, such as a call mode, a recording mode and a voice recognition mode, the microphone is configured to receive an external audio signal. The received audio signal may be further stored in the memory 704 or sent through the communication component 716. In some embodiments, the audio component 710 may further include a loudspeaker for outputting the audio signal.

The I/O interface 712 provides an interface between the processing component 702 and a peripheral interface module, and the peripheral interface module may be a keyboard, a click wheel, buttons and the like. These buttons may include but are not limited to: a home button, a volume button, a start button and a lock button.

The sensor component 714 includes one or more sensors, configured to provide state evaluation of various aspects for the apparatus 700. In some embodiments, the sensor component 714 may detect a start/shut-down state of the apparatus 700 and relative positioning of the components. In some embodiments, the components are a display and a keypad of the apparatus 700. The sensor component 714 may further detect position change of the apparatus 700 or one component of the apparatus 700, whether there is contact between the user and the apparatus 700, and azimuth or speed up/speed down and temperature change of the apparatus 700. The sensor component 714 may include a proximity sensor, configured to detect existence of a nearby object without any physical contact. The sensor component 714 may further include an optical sensor, such as a CMOS or CCD image sensor, for use in imaging application. In some embodiments, the sensor component 714 may further include an acceleration sensor, a gyroscope sensor, a magnetic sensor, a pressure sensor or a temperature sensor.

The communication component 716 is configured to facilitate wired or wireless communication between the apparatus 700 and the other devices. The apparatus 700 may be accessed to a wireless network based on a communication standard, such as WiFi, 2G or 3G, 4G LTE, 5G NR (new radio) or their combination. In some embodiments, the communication component 716 receives a broadcast signal or related broadcast information from an external broadcast management system through a broadcast channel. In some embodiments, the communication component 716 may further include a near-field communication (NFC) module to facilitate short-range communication. In some embodiments, the NFC module may be realized based on a radio frequency identification (RFID) technology, an infra-red data association (IrDA) technology, an ultra wide band (UWB) technology, a Bluetooth (BT) technology and other technologies.

In some embodiments, the apparatus 700 may be realized by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In some embodiments, the disclosure further provides a non-temporary computer readable storage medium including instructions, such as the memory 704 including the instructions in some embodiments. The instructions may be executed by the processor 720 of the apparatus 700 to complete the above method. In some embodiments, the non-temporary computer readable storage medium may be an ROM, a random access memory (RAM), a CD-ROM, a magnetic tape, a floppy disk, an optical data storage device and the like.

Those skilled in the art will easily figure out other implementation solutions of the disclosure after considering the specification and practicing the disclosure disclosed herein. The disclosure intends to cover any transformation, application or adaptive change which conform to a general principle of the disclosure and include common general knowledge or conventional technical means which are not disclosed herein in the technical field. The specification and the embodiments are only regarded as exemplary, and the true scope and spirit of the disclosure are indicated by the following claims.

It should be understood that the disclosure is not limited to accurate structures described above and shown in the drawings and accepts various modifications and changes without departing from its scope. The scope of the disclosure is limited only by the appended claims.

The above description is only some embodiments of the disclosure without limiting the disclosure. Any modification, equivalent replacement, improvements and the like made within the spirit and the principle of the disclosure should fall in the protection scope of the disclosure.

The invention claimed is:

1. An image processing method, comprising:
   obtaining an image frame obtained through photographing and performing background separation on the image frame to obtain a subject frame and a background frame;
   obtaining a plurality of target background frames based on the background frame, wherein the plurality of target background frames contain the same background content, and sizes of the background content in the plurality of target background frames are inconsistent; and
   synthesizing a target subject frame and the plurality of target background frames respectively to obtain a plurality of target image frames, and encoding the plurality of obtained target image frames into a video file, wherein the target subject frame is one frame of an image in the subject frame; wherein
   obtaining the image frame obtained through photographing and performing background separation on the image frame to obtain the subject frame and the background frame comprises:
     obtaining a plurality of image frames obtained through photographing, wherein a filmed subject is located in the same position in each image frame;
     performing background separation on the plurality of image frames respectively to obtain a plurality of subject frames and a plurality of background frames; and
     selecting one subject frame from the plurality of subject frames as the target subject frame; and wherein
   obtaining the plurality of target background frames based on the background frame comprises:
     determining at least two of the plurality of background frames obtained through background separation as the target background frames.

2. The image processing method according to claim 1, wherein the selecting the one subject frame from the plurality of subject frames as the target subject frame comprises:
   selecting the one subject frame from the plurality of subject frames as the target subject frame according to a pre-defined selecting rule; wherein
   the pre-defined selecting rule comprises one of the following:
     among the plurality of subject frames, the subject frame of which the filmed subject accounts for a maximum or a minimum may be used as the target subject frame; and
     the subject frame obtained through separation of the image frame photographed earliest or latest is used as the target subject frame.

3. The image processing method according to claim 1, wherein encoding the plurality of obtained target image frames into the video file comprises:
   determining a time sequence of photographing the plurality of image frames to which the plurality of target background frames correspond respectively;
   sequencing the plurality of target image frames according to the determined time sequence; and
   encoding the plurality of target image frames into the video file according to a sequencing result.

4. The image processing method according to claim 1, wherein encoding the plurality of obtained target image frames into the video file comprises:
   determining ratios which backgrounds account for in the plurality of target background frames, and sequencing the plurality of target image frames obtained through synthesis based on the plurality of target background frames according to a pre-defined ratio sequencing rule; and
   encoding the plurality of target image frames into a video according to a sequencing result.

5. An electronic device, comprising:
   a processor; and
   a memory, configured to store instructions that are executable by the processor; wherein
   the processor executes the executable instructions to realize an image processing method, the image processing method comprising:
     obtaining an image frame obtained through photographing and performing background separation on the image frame to obtain a subject frame and a background frame;
     obtaining a plurality of target background frames based on the background frame, wherein the plurality of target background frames contain the same background content, and sizes of the background content in the plurality of target background frames are inconsistent; and
     synthesizing a target subject frame and the plurality of target background frames respectively to obtain a plurality of target image frames, and encoding the plurality of obtained target image frames into a video file, wherein the target subject frame is one frame of an image in the subject frame; wherein
     obtaining the image frame obtained through photographing and performing background separation on the image frame to obtain the subject frame and the background frame comprises:

obtaining a plurality of image frames obtained through photographing, wherein a filmed subject is located in the same position in each image frame;

performing background separation on the plurality of image frames respectively to obtain a plurality of subject frames and a plurality of background frames; and selecting one subject frame from the plurality of subject frames as the target subject frame; and wherein obtaining the plurality of target background frames based on the background frame comprises:

determining at least two of the plurality of background frames obtained through background separation as the target background frames.

6. The electronic device according to claim 5, wherein the selecting the one subject frame from the plurality of subject frames as the target subject frame comprises:

selecting the one subject frame from the plurality of subject frames as the target subject frame according to a pre-defined selecting rule; wherein the pre-defined selecting rule comprises one of the following:

among the plurality of subject frames, the subject frame of which the filmed subject accounts for a maximum or a minimum may be used as the target subject frame; and the subject frame obtained through separation of the image frame photographed earliest or latest is used as the target subject frame.

7. The electronic device according to claim 5, wherein encoding the plurality of obtained target image frames into the video file comprises:

determining a time sequence of photographing the plurality of image frames to which the plurality of target background frames correspond respectively;

sequencing the plurality of target image frames according to the determined time sequence; and encoding the plurality of target image frames into the video file according to a sequencing result.

8. The electronic device according to claim 5, wherein encoding the plurality of obtained target image frames into the video file comprises:

determining ratios which backgrounds account for in the plurality of target background frames;

sequencing the plurality of target image frames obtained through synthesis based on the plurality of target background frames according to a pre-defined ratio sequencing rule; and encoding the plurality of target image frames into a video according to a sequencing result.

9. A non-transitory computer readable storage medium storing executable instructions thereon that, when executed by a processor, cause the processor to perform an image processing method, the image processing method comprising:

obtaining an image frame obtained through photographing and performing background separation on the image frame to obtain a subject frame and a background frame;

obtaining a plurality of target background frames based on the background frame, wherein the plurality of target background frames contain the same background content, and sizes of the background content in the plurality of target background frames are inconsistent; and synthesizing a target subject frame and the plurality of target background frames respectively to obtain a plurality of target image frames, and encoding the plurality of obtained target image frames into a video file, wherein the target subject frame is one frame of an image in the subject frame; wherein obtaining the image frame obtained through photographing and performing background separation on the image frame to obtain the subject frame and the background frame comprises:

obtaining a plurality of image frames obtained through photographing, wherein a filmed subject is located in the same position in each image frame;

performing background separation on the plurality of image frames respectively to obtain a plurality of subject frames and a plurality of background frames; and selecting one subject frame from the plurality of subject frames as the target subject frame; and wherein obtaining the plurality of target background frames based on the background frame comprises:

determining at least two of the plurality of background frames obtained through background separation as the target background frames.

* * * * *